United States Patent
Tanami

(10) Patent No.: US 9,841,610 B2
(45) Date of Patent: Dec. 12, 2017

(54) OBSERVATION OPTICAL SYSTEM AND OBSERVATION APPARATUS INCLUDING THE SAME

(71) Applicant: CANON KABUSHIKI KAISHA, Tokyo (JP)

(72) Inventor: Yasunori Tanami, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/255,424

(22) Filed: Sep. 2, 2016

(65) Prior Publication Data

US 2017/0075128 A1    Mar. 16, 2017

(30) Foreign Application Priority Data

Sep. 15, 2015    (JP) .................................. 2015-181771

(51) Int. Cl.
*G02B 27/64* (2006.01)
*G02B 25/00* (2006.01)
(Continued)

(52) U.S. Cl.
CPC ........... *G02B 27/646* (2013.01); *G02B 7/003* (2013.01); *G02B 23/02* (2013.01); *G02B 25/001* (2013.01); *G02B 27/0025* (2013.01)

(58) Field of Classification Search
CPC ...... G02B 27/646; G02B 13/02; G02B 13/18; G02B 15/173; G02B 23/18; G02B 25/001; G02B 15/14; G02B 15/163; G02B 27/64; G02B 6/03666; G02B 9/14; G02B 9/36; G02B 9/12–9/32; G02B 13/04; G02B 9/34–9/58; G02B 9/00–9/64;
(Continued)

(56) References Cited

U.S. PATENT DOCUMENTS 2,481,688 A * 9/1949 Schade .................... G02B 9/34
359/779
3,291,553 A * 12/1966 Mandler ................ G02B 13/00
359/740
(Continued)

FOREIGN PATENT DOCUMENTS

JP    H11194262 A    7/1999
JP    H11258518 A    9/1999

*Primary Examiner* — Bumsuk Won
*Assistant Examiner* — Balram Parbadia
(74) *Attorney, Agent, or Firm* — Rossi, Kimms & McDowell LLP

(57) ABSTRACT

Provided is an observation optical system including: an objective lens; an image inverting unit; and an ocular lens, the objective lens including, in order from object side to observation side: a positive first lens unit; a negative second lens unit; and a positive third lens unit, wherein the first lens unit consists of a positive front unit and a positive rear unit separated by an air interval, which is largest along optical axis, wherein the second lens unit moves to have a component orthogonal to optical axis for image blur correction, and wherein a lateral magnification of second lens unit, a curvature radius of a lens surface of second lens unit closest to observation side, a curvature radius of a lens surface of third lens unit closest to object side, the air interval between front and rear units, and a focal length of first lens unit are appropriately set.

7 Claims, 5 Drawing Sheets

(51) Int. Cl.
*G02B 7/00* (2006.01)
*G02B 23/02* (2006.01)
*G02B 27/00* (2006.01)

(58) Field of Classification Search
CPC ..... G02B 13/004–13/0045; G02B 3/04; G02B 15/00–15/28
See application file for complete search history.

(56) References Cited

U.S. PATENT DOCUMENTS

| | | | | |
|---|---|---|---|---|
| 3,445,154 A * | 5/1969 | Schlegel | ................... | G02B 9/34 |
| | | | | 359/779 |
| 4,118,108 A * | 10/1978 | Muszumanski | ........ | G02B 15/14 |
| | | | | 359/690 |
| 4,200,357 A * | 4/1980 | Itaya | ................... | G02B 25/001 |
| | | | | 359/644 |
| 4,842,395 A * | 6/1989 | Sato | ................... | G02B 15/177 |
| | | | | 359/380 |
| 6,046,853 A * | 4/2000 | Yano | ................... | G02B 27/646 |
| | | | | 359/407 |
| 6,226,122 B1 | 5/2001 | Sugawara | | |
| 6,226,123 B1 | 5/2001 | Kanai et al. | | |
| 7,474,479 B2 * | 1/2009 | Isono | ................... | G02B 9/34 |
| | | | | 359/779 |
| 8,000,032 B2 * | 8/2011 | Yeh | ................... | G02B 15/173 |
| | | | | 359/715 |
| 8,654,456 B2 * | 2/2014 | Eguchi | ................... | G02B 13/18 |
| | | | | 359/743 |
| 2008/0055742 A1 * | 3/2008 | Sato | ................... | G02B 9/34 |
| | | | | 359/779 |

\* cited by examiner

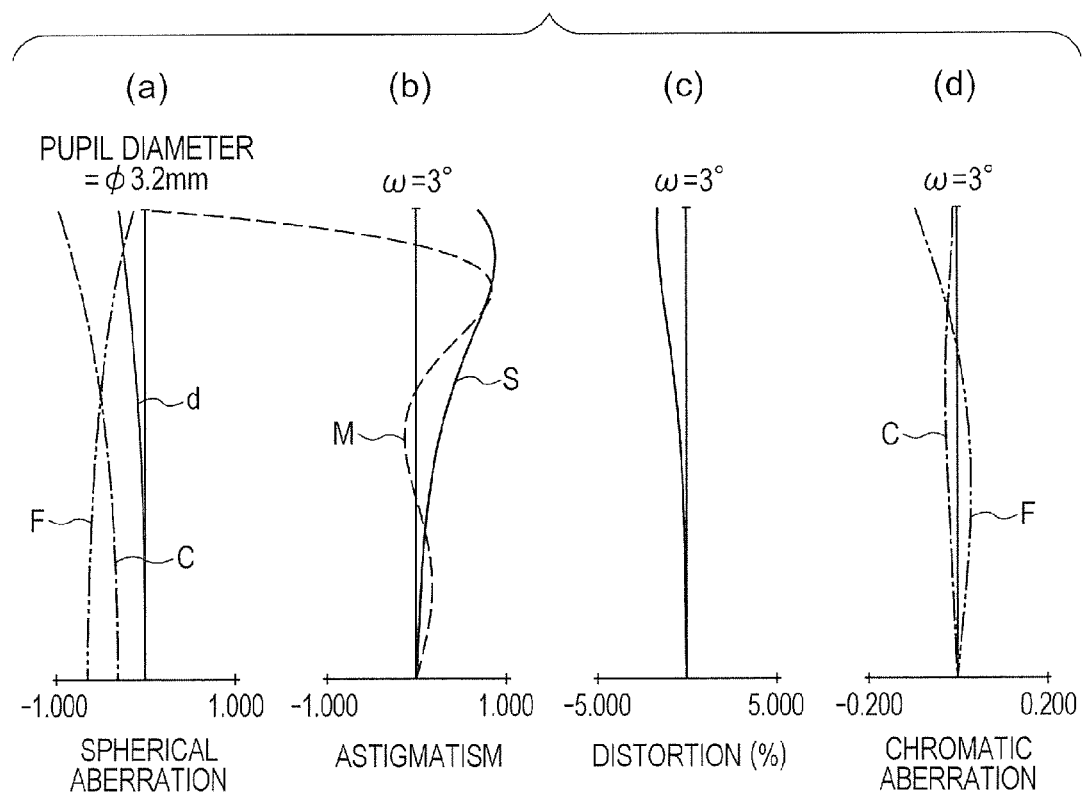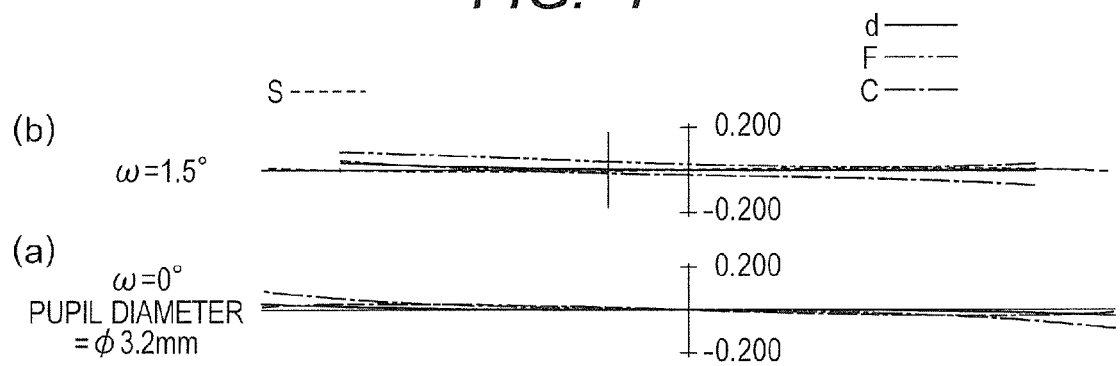

OBSERVATION OPTICAL SYSTEM AND OBSERVATION APPARATUS INCLUDING THE SAME

BACKGROUND OF THE INVENTION

Field of the Invention

The present invention relates to an observation optical system and an observation apparatus including the same, and the observation optical system is suitable for use as an observation optical system of observation apparatus, such as binoculars and telescopes having a function (image stabilization) of optically correcting image blur caused by shaking, for example.

Description of the Related Art

In observation of targets (objects) with observation optical systems of observation apparatus, such as binoculars and telescopes, as a magnification (observation magnification) of the observation optical system becomes higher, stronger image blur is caused by shaking. Hitherto, as observation optical systems to be used for observation apparatus, there have been known observation optical systems employing image stabilization in order to reduce image blur caused by shaking. In many types of observation optical systems, an object image formed by an objective lens is inverted to an erect image by an image inverting unit, and this erect image is observed through an ocular lens in an enlarged manner.

In Japanese Patent Application Laid-Open No. H11-194262, there is described an objective lens including a first lens unit having a positive refractive power, a second lens unit having a negative refractive power, and a third lens unit having a positive refractive power. As an image blur correcting system, at least one of the second lens unit and the third lens unit is configured to move in a direction perpendicular to an optical axis for image blur correction. In Japanese Patent Application Laid-Open No. H11-258518, there is disclosed an objective lens including a first lens unit having a positive refractive power, a second lens unit having a negative refractive power, and a third lens unit having a positive refractive power. As an image blur correcting system, at least one lens unit forming the objective lens is configured to move in a direction perpendicular to an optical axis for image blur correction.

In general, observation optical systems having image stabilization are demanded to accurately perform image blur correction with a small aberration variation during image blur correction. In order to satisfy those demands, it is important to appropriately set, for example, the lens configurations of an objective lens and an image stabilizing lens unit for image blur correction, which form an observation optical system.

SUMMARY OF THE INVENTION

According to one embodiment of the present invention, there is provided an observation optical system for observing an object image enlarged by an ocular lens, the observation optical system including: an objective lens; an image inverting unit configured to invert an object image formed by the objective lens to an erect image; and the ocular lens configured to enlarge the erect image, the objective lens including, in order from an object side to an observation side: a first lens unit having a positive refractive power, which is configured not to move for image blur correction; a second lens unit having a negative refractive power, which is configured to move for image blur correction; and a third lens unit having a positive refractive power, which is configured not to move for image blur correction, in which the first lens unit consists of, in order from the object side to the observation side, a front unit having a positive refractive power and a rear unit having a positive refractive power, which are separated by an air interval, which is a largest air interval in a direction of an optical axis, in which the second lens unit is configured to move so as to have a component in a direction orthogonal to the optical axis for image blur correction, and in which the following conditional expressions are satisfied:

$$2.0 \le |\beta_2| \le 10.0;$$

$$-0.5 \le (G3R1+G2R2)/(G3R1-G2R2) \le 0.5; \text{ and}$$

$$d/f_1 > 0.1,$$

where $\beta_2$ represents a lateral magnification of the second lens unit, G2R2 represents a curvature radius of a lens surface of the second lens unit that is closest to the observation side, G3R1 represents a curvature radius of a lens surface of the third lens unit that is closest to the object side, d represents the air interval between the front unit and the rear unit on the optical axis, and $f_1$ represents a focal length of the first lens unit.

Further features of the present invention will become apparent from the following description of exemplary embodiments with reference to the attached drawings.

BRIEF DESCRIPTION OF THE DRAWINGS

FIG. 6 is aberration diagrams of the observation optical system of Example 2.

FIG. 7 is lateral aberration diagrams of the observation optical system of Example 2 when image blur correction is not performed.

DESCRIPTION OF THE EMBODIMENTS

Now, an exemplary embodiment of the present invention is described in detail with reference to the attached drawings. An observation optical system of the present invention includes an objective lens, an image inverting unit configured to invert an object image formed by the objective lens to an erect image, and an ocular lens configured to enlarge the erect image. The object image enlarged by the ocular lens is observed by an observer.

Figure 1:
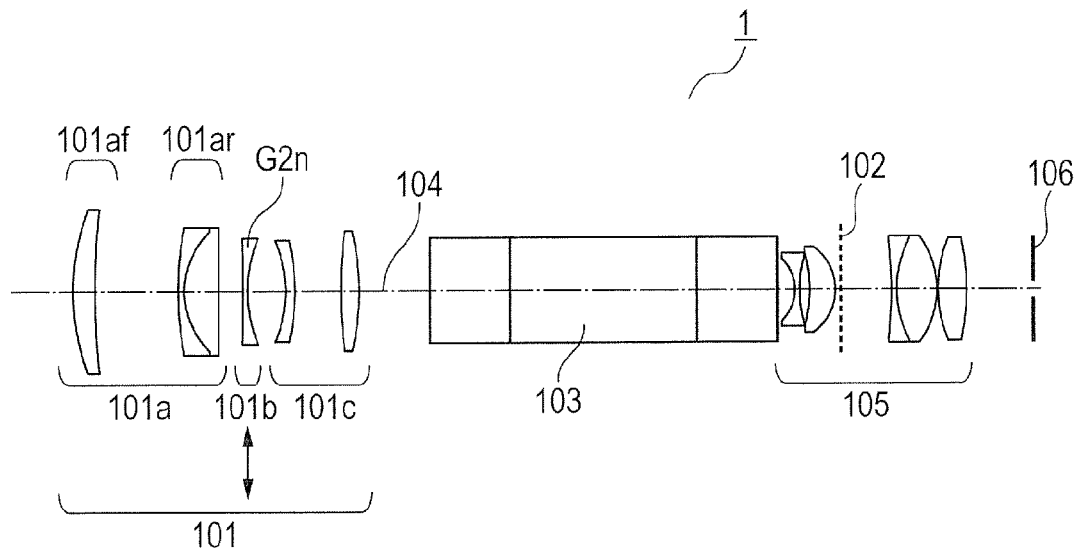
FIG. 1 is a lens sectional view of an observation optical system according to Example 1 of the present invention.
Figure 2:
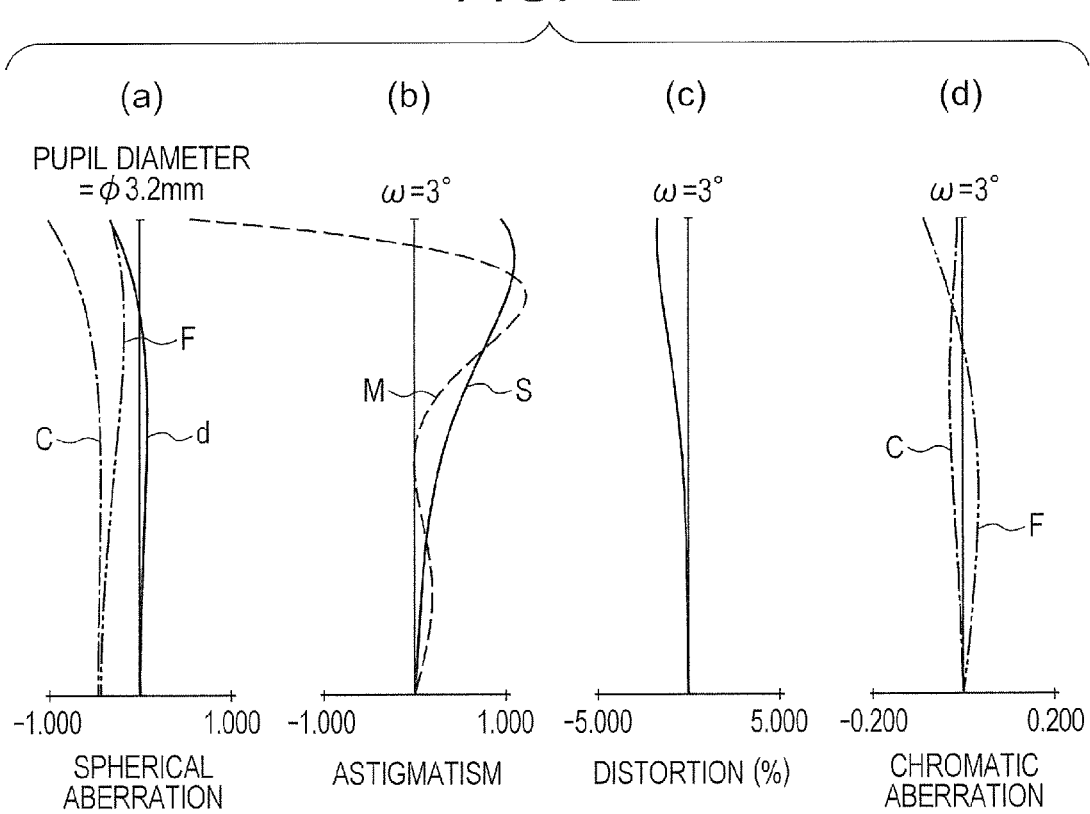
FIG. 2 is aberration diagrams of the observation optical system of Example 1.

FIG. 1 is a lens sectional view of Example 1 of the present invention. FIG. 2 is aberration diagrams of Example 1. A spherical aberration, astigmatism, distortion, and a lateral chromatic aberration are shown in (a), (b), (c) and (d) of FIG. 2, respectively. In FIG. 2, d, F, and C represent d-line (wavelength of 587.6 nm), F-line (wavelength of 486.1 nm), and C-line (wavelength of 656.3 nm), respectively. M represents a meridional image plane of the d-line, and S represents a sagittal image plane of the d-line. The same applies to a subsequent Example.

Figure 3:
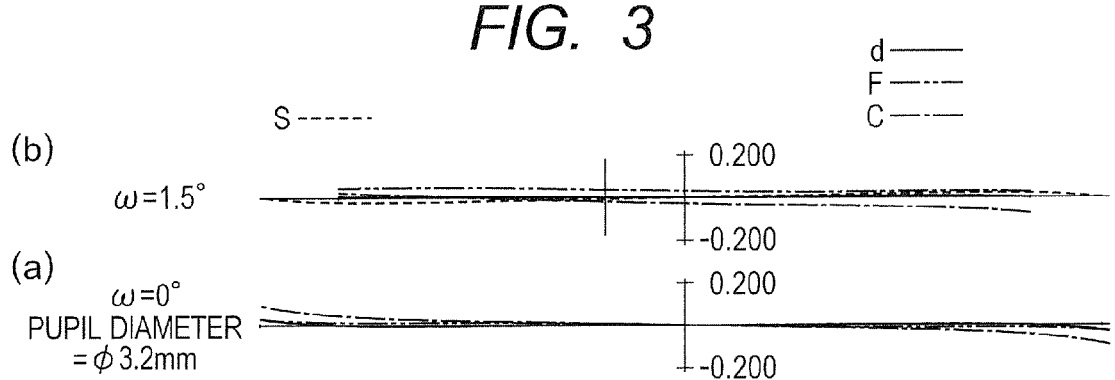
FIG. 3 is lateral aberration diagrams of the observation optical system of Example 1 when image blur correction is not performed.
Figure 4:
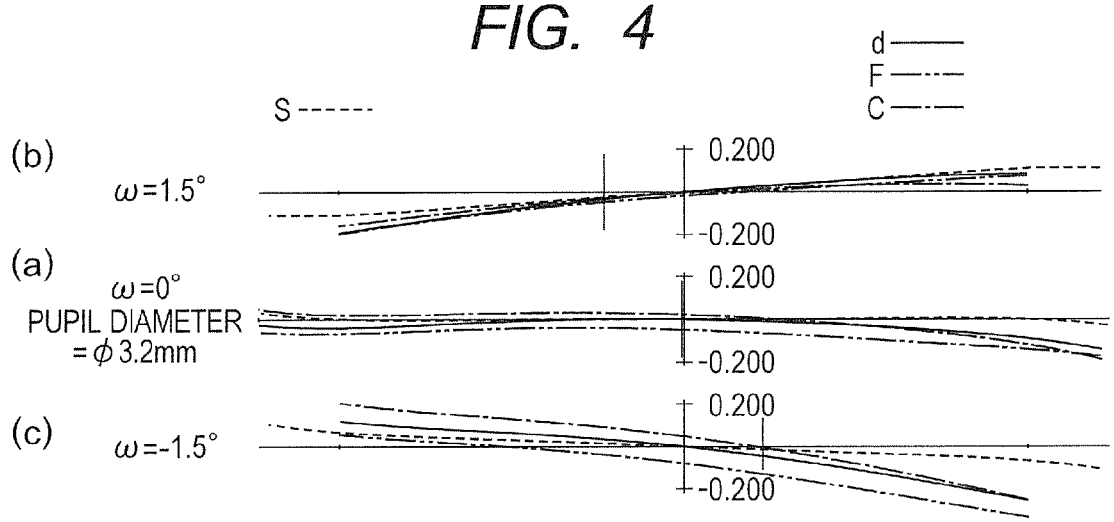
FIG. 4 is lateral aberration diagrams of the observation optical system of Example 1 when image blur correction is performed.

FIG. 3 and FIG. 4 are lateral aberration diagrams without and with image blur correction by a second lens unit of Example 1, respectively. A lateral aberration observed when image blur correction is not performed is shown in FIG. 3. A case of a half angle of view (image pickup half angle of view) ω of 0° is shown in (a) of FIG. 3, and a case of a half angle of view ω of 1.5° is shown in (b) of FIG. 3. FIG. 4 is lateral aberration diagrams when the second lens unit is shifted by 1.5 mm with respect to an optical axis (corresponding to correction angle of 1°), and cases of the half angle of view ω of 0°, the half angle of view ω of 1.5°, and a half angle of view ω of −1.5° are shown in (a), (b) and (c) of FIG. 4, respectively. In Example 1, the image pickup angle of view is 6° at the maximum, and hence the half angle of view ω of 1.5° or −1.5° indicates the half of the half angle of view. Also this point applies to the subsequent Example.

Figure 5:
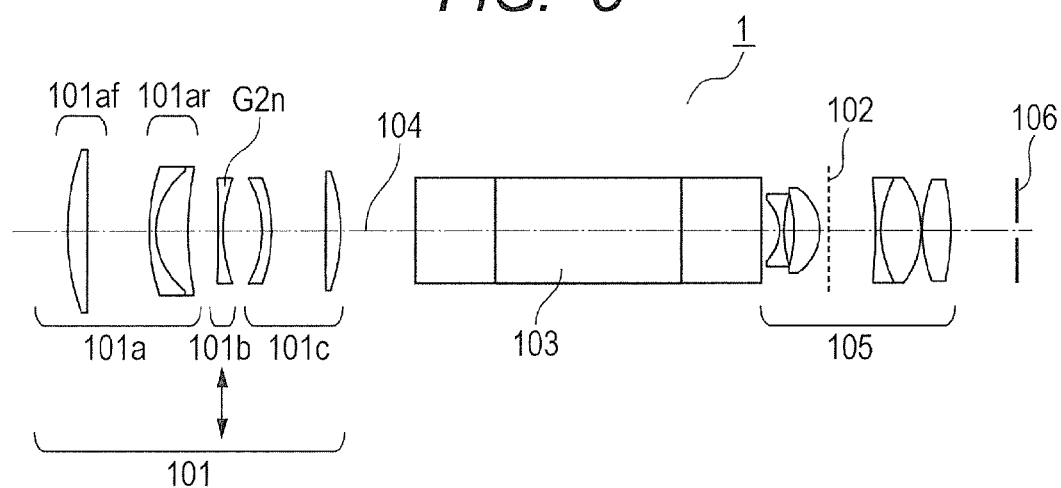
FIG. 5 is a lens sectional view of an observation optical system according to Example 2 of the present invention.
Figure 8:
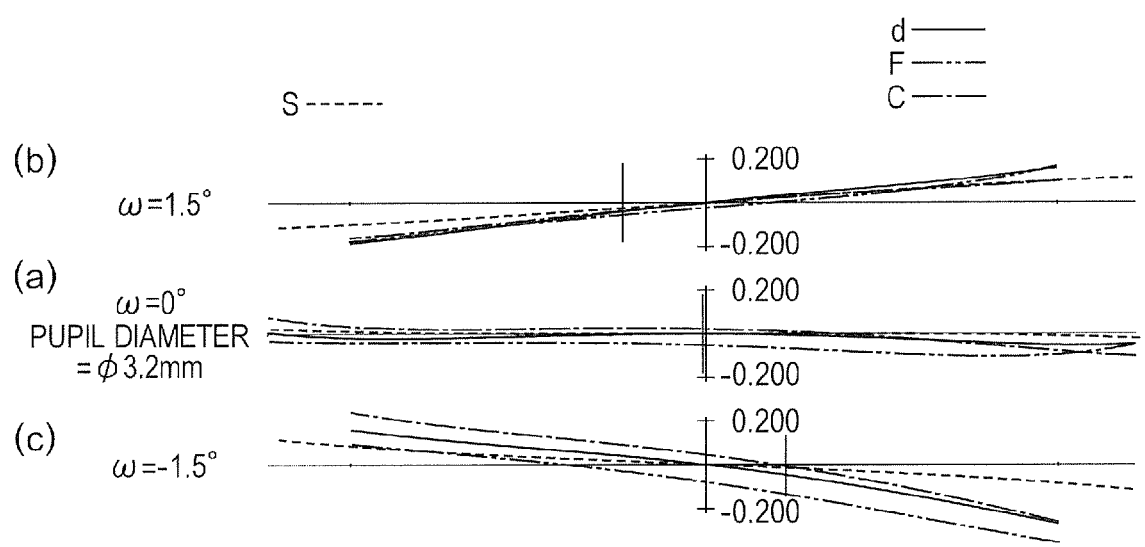
FIG. 8 is lateral aberration diagrams of the observation optical system of Example 2 when image blur correction is performed.

FIG. 5 is a lens sectional view of Example 2 of the present invention. FIG. 6 is aberration diagrams of Example 2. A spherical aberration, astigmatism, distortion, and a lateral chromatic aberration are illustrated in (a), (b), (c) and (d) of FIG. 6, respectively. FIG. 7 and FIG. 8 are lateral aberration diagrams without and with image blur correction by a second lens unit of Example 2, respectively.

A lateral aberration observed when image blur correction is not performed is shown in FIG. 7. A case of a half angle of view ω of 0° is shown in (a) of FIG. 7, and a case of a half angle of view ω of 1.5° is shown in (b) of FIG. 7. FIG. 8 is lateral aberration diagrams when the second lens unit is shifted by 1.5 mm with respect to an optical axis (corresponding to correction angle of 1°), and cases of the half angle of view ω of 0°, the half angle of view ω of 1.5°, and a half angle of view ω of −1.5° are shown in (a), (b) and (c) of FIG. 8, respectively. In Example 2, the image pickup angle of view is 6° at the maximum, and hence the half angle of view ω of 1.5° or −1.5° indicates the half of the half angle of view.

In FIG. 1 and FIG. 5, there is illustrated an observation optical system 1. An objective lens 101 includes three lens units of a first lens unit 101a having a positive refractive power, a second lens unit 101b having a negative refractive power, and a third lens unit 101c having a positive refractive power. An image inverting unit 103 is, for example, a Porro prism or a pentaprism. The optical path of the image inverting unit 103, which is formed as a prism or the like, is developed and is illustrated as a block. There are also illustrated an optical axis 104, an ocular lens 105, and an eye point 106 at which eyes of an observer are positioned.

An image plane of an object is formed by the objective lens 101 at an image plane position 102. The first lens unit 101a consists of a front unit 101af having a positive refractive power and a rear unit 101ar having a positive refractive power, which are separated by an air interval, which is the largest air interval in the direction of an optical axis.

In the observation optical system 1 of Examples 1 and 2, an object image formed by the objective lens 101 is inverted to an erect image by the image inverting unit 103, the erect image is enlarged by the ocular lens 105, and the enlarged image is observed at the eye point 106. In Examples 1 and 2, when the observation optical system 1 is shaken due to shaking and the like, the second lens unit 101b moves so as to have a component in a direction orthogonal to the optical axis 104, to thereby correct image blur.

In the observation optical system 1 of each Example, the lens units of the objective lens 101 are arranged in order from an object side to an observation side. The objective lens 101 includes the first lens unit 101a having a positive refractive power, which is configured not to move for image blur correction, the second lens unit 101b having a negative refractive power, which is configured to move for image blur correction, and the third lens unit 101c having a positive refractive power, which is configured not to move for image blur correction. The first lens unit consists of, in order from the object side to the observation side, the front unit 101af having a positive refractive power and the rear unit 101ar having a positive refractive power, and the air interval, which is the largest air interval in the direction of the optical axis, is provided between the front unit 101af and the rear unit 101ar. The second lens unit 101b is configured to move so as to have the component in the direction orthogonal to the optical axis for image blur correction.

A lateral magnification of the second lens unit 101b is represented by $\beta_2$. A curvature radius of a lens surface of the second lens unit 101b that is closest to the observation side is represented by G2R2. A curvature radius of a lens surface of the third lens unit 101c that is closest to the object side is represented by G3R1. The interval between the front unit 101af and the rear unit 101ar is represented by d. A focal length of the first lens unit 101a is represented by $f_1$.

In this case, the following conditional expressions are satisfied.

$$2.0 \le |\beta_2| \le 10.0 \quad (1)$$

$$-0.5 \le (G3R1+G2R2)/(G3R1-G2R2) \le 0.5 \quad (2)$$

$$d/f_1 > 0.1 \quad (3)$$

Next, the technical meanings of the respective conditional expressions are described. Conditional Expression (1) relates to the lateral magnification of the second lens unit 101b for image blur correction. If the value falls below the lower limit of Conditional Expression (1), a movement amount of the second lens unit 101b for image blur correction becomes much larger. Further, if the value exceeds the upper limit of Conditional Expression (1), the sensitivity of the second lens unit L2 for image stabilization becomes much higher, and hence it becomes difficult to perform mechanical operation with high accuracy.

Conditional Expression (2) relates to the shape factor (shape) of an air lens formed between the second lens unit 101b and the third lens unit 101c. If the value exceeds the upper limit of Conditional Expression (2) or falls below the lower limit thereof, eccentric coma, which is generated when image blur correction is performed by the second lens unit 101b, is increased.

Conditional Expression (3) relates to a distance between the front unit 101af and the rear unit 101ar that form the first lens unit 101a. If the value falls below the lower limit of Conditional Expression (3), the effective diameter of the rear unit 101ar of the first lens unit 101a becomes larger, and astigmatism and field curvature are increased due to the first lens unit 101a, with the result that it becomes difficult to correct those various aberrations. It is preferred to set the numerical range of Conditional Expressions (1) to (3) as follows.

$$4.0 \leq |\beta_2| \leq 8.0 \tag{1a}$$

$$-0.4 \leq (G3R1+G2R2)/(G3R1-G2R2) \leq 0.0 \tag{2a}$$

$$d/f_1 > 0.15 \tag{3a}$$

As described above, according to each Example, an observation optical system capable of easily reducing reduction in optical characteristics, which is caused when a correction angle for image blur is large, can be obtained.

In each Example, it is more preferred to satisfy at least one of the following conditional expressions. The second lens unit 101b consists of one negative lens G2n. A refractive index of a material of the negative lens G2n with respect to the wavelength d-line is represented by $n_d$, and an Abbe number of the material of the negative lens G2n with reference to the wavelength d-line is represented by $v_d$. The first lens unit 101a is a lens unit configured to move in the direction orthogonal to the optical axis, thereby performing optical axis parallel alignment adjustment. The optical axis parallel alignment adjustment is performed in order to make a right field of view and a left field of view equal to each other. A curvature radius of a lens surface of the first lens unit 101a that is closest to the observation side is represented by G1R2, and a curvature radius of a lens surface of the second lens unit 101b that is closest to the object side is represented by G2R1. At this time, it is preferred to satisfy at least one of the following conditional expressions.

$$n_d \geq 1.58 \tag{4}$$

$$v_d \geq 40.0 \tag{5}$$

$$-1.5 \leq (G2R1+G1R2)/(G2R1-G1R2) \leq 1.5 \tag{6}$$

Next, the technical meanings of the above-mentioned conditional expressions are described. Conditional Expressions (4) and (5) relate to the material of the negative lens G2n.

If the value falls below the lower limit of Conditional Expression (4), eccentric coma is increased during image blur correction, and it becomes difficult to correct the eccentric coma. Further, if the value falls below the lower limit of Conditional Expression (5), chromatic dispersion caused by the negative lens G2n becomes larger, and hence a lateral chromatic aberration, especially an eccentric lateral chromatic aberration becomes much larger, which is not preferred.

Conditional Expression (6) relates to the shape factor (shape) of the air lens formed between the first lens unit 101a and the second lens unit 101b. Conditional Expression (6) is intended to reduce eccentric coma, which is generated when optical axis parallel alignment adjustment is performed by moving the first lens unit 101a in the direction orthogonal to the optical axis. If the value exceeds the range of Conditional Expression (6), eccentric coma is increased by the first lens unit 101a, which is not preferred. It is more preferred to set the numerical ranges of Conditional Expressions (4) to (6) as follows.

$$n_d \geq 1.585 \tag{4a}$$

$$v_d \geq 60.0 \tag{5a}$$

$$-1.3 \leq (G2R1+G1R2)/(G2R1-G1R2) \leq 1.0 \tag{6a}$$

In the following, in each Example, in order to correct various aberrations, it is preferred that the front unit 101af include one positive lens, and the rear unit 101ar include a negative lens and a positive lens. Further, it is preferred that the second lens unit 101b include a negative lens having a biconcave shape. Further, it is preferred that the third lens unit 101c include, in order from the object side to the observation side, a negative lens and a positive lens.

It is found from FIG. 4 that, in Example 1, the optical characteristics are satisfactory even during image blur correction. The resolution power near the center is important especially when the observation optical system is used for a telescope, for example, and it is also found from FIG. 4 that deterioration in aberration is small.

Although, as the ocular lens 105, the four-unit lens configuration including the five lenses is described in Example 1, the ocular lens 105 is not limited thereto and may be a Kellner lens, for example. Further, in Example 1, focus adjustment may be performed by moving a part or all of the lens units of the objective lens 101, or the ocular lens 105. Alternatively, focus adjustment may be performed by the image inverting unit 103. Any method can be employed to adjust the focus.

It is found from FIG. 8 that, in Example 2, the optical characteristics are satisfactory even during image blur correction. The resolution power near the center is important especially when the observation optical system is used for a telescope, for example, and it is also found from FIG. 8 that deterioration in aberration is small. Although, as the ocular lens 105, the four-unit lens configuration including the five lenses is described in Example 2, the ocular lens 105 is not limited thereto and may be a Kellner lens, for example. Further, in Example 2, focus adjustment may be performed by moving a part or all of the lens units of the objective lens 101, or the ocular lens 105. Alternatively, focus adjustment may be performed by the image inverting unit 103. Any method can be employed to adjust the focus.

Figure 9:
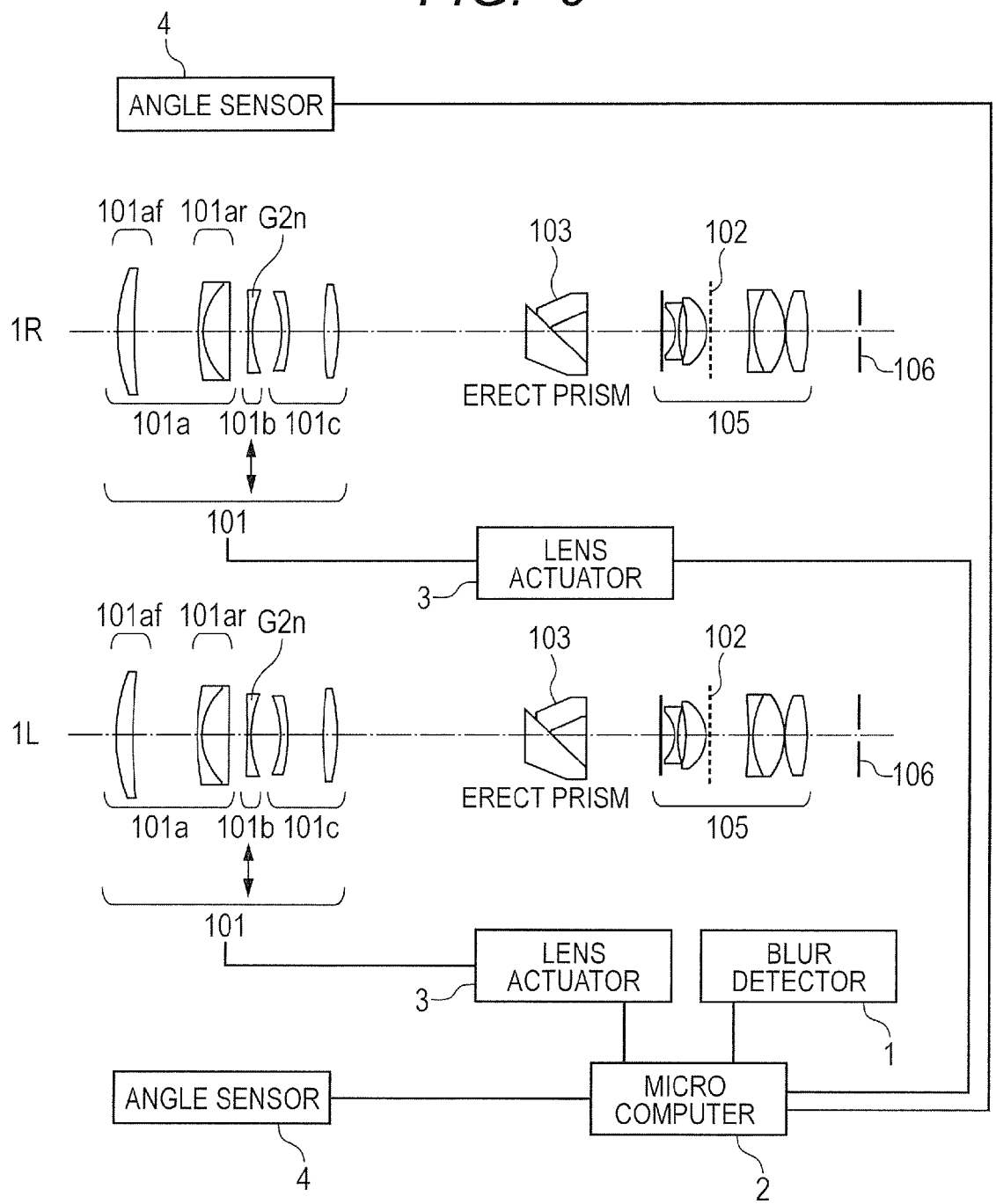
FIG. 9 is a schematic diagram of main parts of binoculars including the observation optical system of the present invention.

FIG. 9 is a schematic diagram of main parts of binoculars including the observation optical system of the present invention. Reference symbol of each member of FIG. corresponds to reference symbol of each member illustrated in FIG. 1. In FIG. 9, an observation optical system 1R is for a right eye, and an observation optical system 1L is for a left eye. In FIG. 9, a blur detector 1 is a vibration gyro sensor including a blur detector for a pitch for detecting vertical blur, and a blur detector for detecting horizontal blur. The sensitivity axes of the two sensors are orthogonal to each other. The blur detector 1 detects angular acceleration, and outputs information on the detection to a microcomputer 2 as a signal.

When receiving the information on blur (angular acceleration) from the blur detector 1, the microcomputer 2 calculates a turning angle of the second lens unit 101b for image blur correction, and outputs the determined value to a lens actuator 3. The lens actuator 3 drives, based on the signal from the microcomputer 2, the second lens unit 101b to turn or to have a component in a direction perpendicular to the optical axis.

An angle sensor 4 measures the turning angle of the second lens unit 101b, and outputs the measured value to the microcomputer 2. When the output matches with the value determined through calculation, the microcomputer 2 controls the lens actuator 3 to stop the driving thereof. In this way, image stabilization is performed.

Now, there are described specific numerical data of the observation optical systems of Examples 1 and 2. Symbol i represents an order from the object side. The surface number i is an order from the object side. Symbol Ri represents a radius of curvature, and Di represents an interval between an i-th surface and an (i+1)th surface. Symbols Ndi and vdi respectively represent a refractive index and an Abbe number of a medium between the i-th surface and the (i+1)th surface with respect to the d-line. In Numerical Data, R1 to R5 correspond to the first lens unit 101a, R6 and R7 correspond to the second lens unit 101b, and R8 to R11 correspond to the third lens unit 101c. R12 to R15 correspond to the image inverting unit 103. R16 to R24 correspond to the ocular lens 105. Values relating to the individual conditional expressions described above are shown in Table 1.

EXAMPLE 1

| Surface No. | R | D | Nd | νd |
|---|---|---|---|---|
| 1 | 50.60304 | 4.80 | 1.806098 | 40.92 |
| 2 | 180.40185 | 18.01 (d) | 1 | |
| 3 | 71.66320 | 1.40 | 1.688931 | 31.07 |
| 4 | 18.28645 | 7.50 | 1.589130 | 61.14 |
| 5 | ∞ | 5.14 | 1 | |
| 6 | −331.25075 | 1.10 | 1.589130 | 61.14 |
| 7 | 31.02273 | 8.27 | 1 | |
| 8 | −27.82834 | 2.00 | 1.698947 | 30.13 |
| 9 | −49.87193 | 9.98 | 1 | |
| 10 | 102.27336 | 4.00 | 1.701536 | 41.24 |
| 11 | −57.98923 | 15.34 | 1 | |
| 12 | ∞ | 17.50 | 1.568832 | 56.36 |
| 13 | ∞ | 40.50 | 1.568832 | 56.36 |
| 14 | ∞ | 17.50 | 1.568832 | 56.36 |
| 15 | ∞ | 3.87 | 1 | |
| 16 | −9.57160 | 1.00 | 1.487490 | 70.23 |
| 17 | 27.81897 | 2.22 | 1 | |
| 18 | −31.55862 | 5.60 | 1.834000 | 37.16 |
| 19 | −11.50148 | 12.11 | 1 | |
| 20 | −99.52848 | 1.20 | 1.846660 | 23.93 |
| 21 | 23.81545 | 8.80 | 1.603112 | 60.64 |
| 22 | −19.40516 | 0.20 | 1 | |
| 23 | 29.74729 | 6.28 | 1.696797 | 55.53 |
| 24 | −47.82907 | 14.50 | 1 | |

EXAMPLE 2

| Surface No. | R | D | Nd | νd |
|---|---|---|---|---|
| 1 | 54.04638 | 4.30 | 1.696797 | 55.53 |
| 2 | ∞ | 13.46 (d) | 1 | |
| 3 | 45.20950 | 1.40 | 1.575006 | 41.50 |
| 4 | 16.57877 | 7.00 | 1.496999 | 81.54 |
| 5 | 65.09072 | 6.60 | 1 | |
| 6 | −310.96597 | 1.10 | 1.592820 | 68.63 |
| 7 | 33.41236 | 8.54 | 1 | |
| 8 | −23.53753 | 2.00 | 1.698947 | 30.13 |
| 9 | −34.51614 | 11.74 | 1 | |
| 10 | 1,457.58461 | 3.30 | 1.696797 | 55.53 |
| 11 | −41.43102 | 16.22 | 1 | |
| 12 | ∞ | 17.50 | 1.568832 | 56.36 |
| 13 | ∞ | 40.50 | 1.568832 | 56.36 |
| 14 | ∞ | 17.50 | 1.568832 | 56.36 |
| 15 | ∞ | 3.87 | 1 | |
| 16 | −9.57160 | 1.00 | 1.487490 | 70.23 |
| 17 | 27.81897 | 2.22 | 1 | |
| 18 | −31.55862 | 5.60 | 1.834000 | 37.16 |
| 19 | −11.50148 | 12.11 | 1 | |
| 20 | −99.52848 | 1.20 | 1.846660 | 23.93 |
| 21 | 23.81545 | 8.80 | 1.603112 | 60.64 |
| 22 | −19.40516 | 0.20 | 1 | |
| 23 | 29.74729 | 6.28 | 1.696797 | 55.53 |
| 24 | −47.82907 | 14.50 | 1 | |

TABLE 1

| | Conditional Expression | Numerical Example 1 | Numerical Example 2 |
|---|---|---|---|
| (1) | $2 \leq |\beta_2| \leq 10$ | 5.196 | 5.215 |
| (2) | $-0.5 \leq (G3R1 + G2R2)/(G3R1 - G2R2) \leq 0.5$ | −0.0543 | −0.173 |
| (3) | $d/f_1 > 0.1$ | 0.267 | 0.190 |
| (4) | $n_d \geq 1.58$ | 1.592820 | 1.589130 |
| (5) | $\nu_d \geq 40$ | 68.63 | 61.14 |
| (6) | $-1.5 \leq (G2R1 + G1R2)/(G2R1 - G1R2) \leq 1.5$ | −1.00 | 0.654 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-181771, filed Sep. 15, 2015, which is hereby incorporated by reference herein in its entirety.

What is claimed is:
1. An observation optical system for observing an object image enlarged by an ocular lens, the observation optical system comprising:
   an objective lens;
   an image inverting unit configured to invert an object image formed by the objective lens to an erect image; and
   the ocular lens configured to enlarge the erect image,
   the objective lens comprising, in order from an object side to an observation side:
      a first lens unit having a positive refractive power, which is configured not to move for image blur correction;
      a second lens unit having a negative refractive power, which is configured to move for image blur correction; and
      a third lens unit having a positive refractive power, which is configured not to move for image blur correction,
   wherein the first lens unit consists of, in order from the object side to the observation side, a front unit having a positive refractive power and a rear unit having a positive refractive power, which are separated by an air interval, which is, within the first lens unit, a largest air interval in a direction of an optical axis,
   wherein the second lens unit is configured to move so as to have a component in a direction orthogonal to the optical axis for image blur correction, and
   wherein the following conditional expressions are satisfied:

$2.0 \leq |\beta_2| \leq 10.0;$ $-0.5 \leq (G3R1+G2R2)/(G3R1-G2R2) \leq 0.5;$ and $d/f_1 > 0.1,$ where $\beta_2$ represents a lateral magnification of the second lens unit, G2R2 represents a curvature radius of a lens surface of the second lens unit that is closest to the observation side, G3R1 represents a curvature radius of a lens surface of the third lens unit that is closest to the object side, d represents the air interval between the front unit and the rear unit on the optical axis, and $f_1$ represents a focal length of the first lens unit.

2. An observation optical system according to claim 1,
wherein the second lens unit consists of one negative lens G2n, and
wherein the following conditional expressions are satisfied:

$n_d \geq 1.58$; and $v_d \geq 40.0$, where $n_d$ represents a refractive index of a material of the negative lens G2n with respect to d-line, and $v_d$ represents an Abbe number of the material of the negative lens G2n with reference to the d-line.

3. An observation optical system according to claim 1,
wherein the first lens unit comprises a lens unit configured to move in the direction orthogonal to the optical axis, thereby performing optical axis parallel alignment adjustment, and
wherein the following conditional expression is satisfied:

$-1.5 \leq (G2R1+G1R2)/(G2R1-G1R2) \leq 1.5$, where G1R2 represents a curvature radius of a lens surface of the first lens unit that is closest to the observation side, and G2R1 represents a curvature radius of a lens surface of the second lens unit that is closest to the object side.

4. An observation optical system according to claim 1, wherein the second lens unit consists of a negative lens having a biconcave shape.

5. An observation optical system according to claim 1, wherein the third lens unit consists of, in order from the object side to the observation side, a negative lens and a positive lens.

6. An observation optical system according to claim 1,
wherein the front unit consists of one positive lens, and
wherein the rear unit consists of a negative lens and a positive lens.

7. An observation apparatus, comprising:
an observation optical system for observing an object image enlarged by an ocular lens, the observation optical system comprising:
an objective lens;
an image inverting unit configured to invert an object image formed by the objective lens to an erect image; and
the ocular lens configured to enlarge the erect image; and
a blur detecting unit configured to detect blur,
the objective lens comprising, in order from an object side to an observation side:
a first lens unit having a positive refractive power, which is configured not to move for image blur correction;
a second lens unit having a negative refractive power, which is configured to move for image blur correction; and
a third lens unit having a positive refractive power, which is configured not to move for image blur correction,
wherein the first lens unit consists of, in order from the object side to the observation side, a front unit having a positive refractive power and a rear unit having a positive refractive power, which are separated by an air interval, which is, within the first lens unit, a largest air interval in a direction of an optical axis,
wherein the second lens unit is configured to move based on the blur detected by the blur detecting unit so as to have a component in a direction orthogonal to the optical axis for image blur correction, and
wherein the following conditional expressions are satisfied:

$2.0 \leq |\beta_2| \leq 10.0$;

$-0.5 \leq (G3R1+G2R2)/(G3R1-G2R2) \leq 0.5$; and $d/f_1 > 0.1$, where $\beta_2$ represents a lateral magnification of the second lens unit, G2R2 represents a curvature radius of a lens surface of the second lens unit that is closest to the observation side, G3R1 represents a curvature radius of a lens surface of the third lens unit that is closest to the object side, d represents the air interval between the front unit and the rear unit on the optical axis, and $f_1$ represents a focal length of the first lens unit.

* * * * *